UNITED STATES PATENT OFFICE.

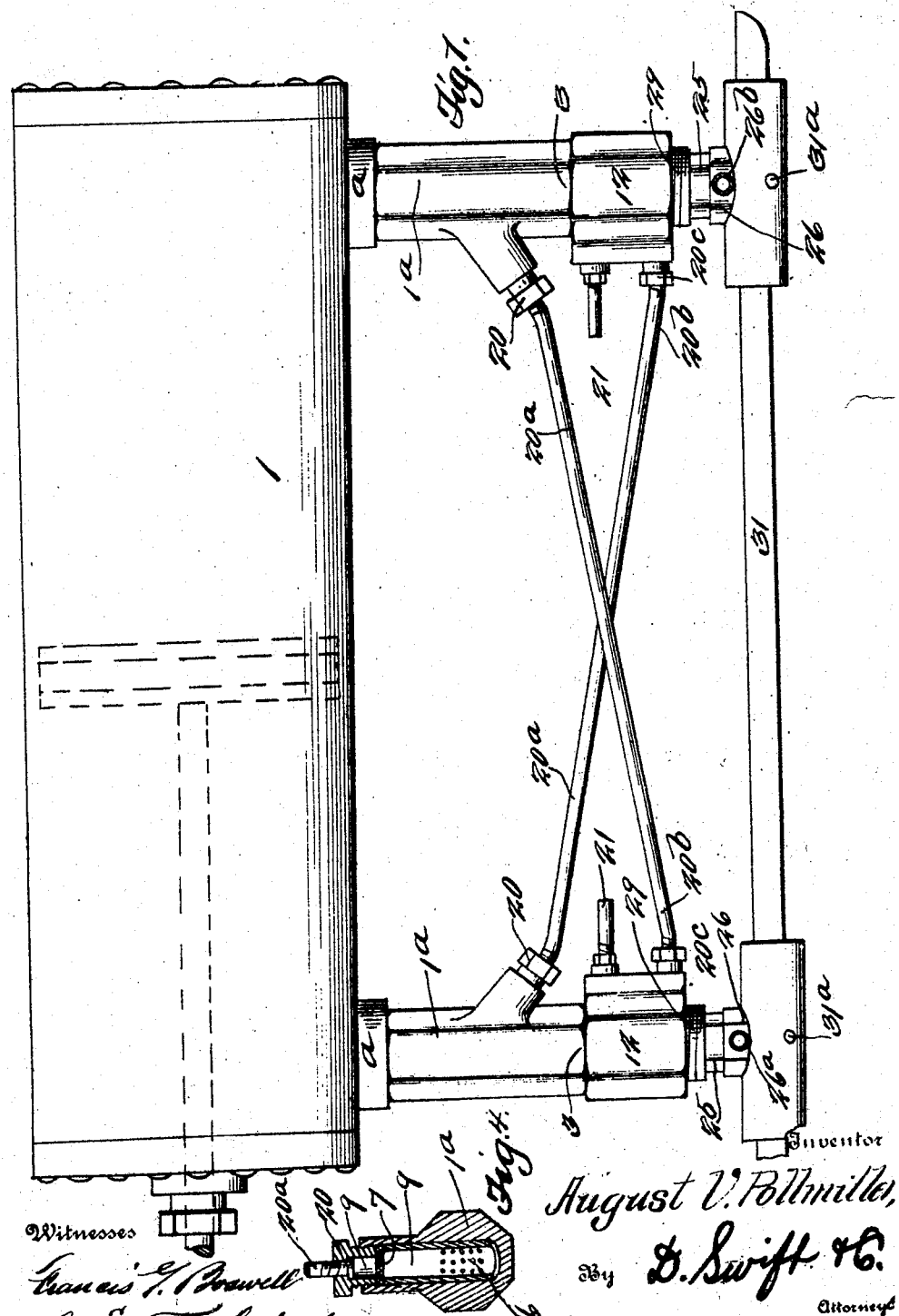

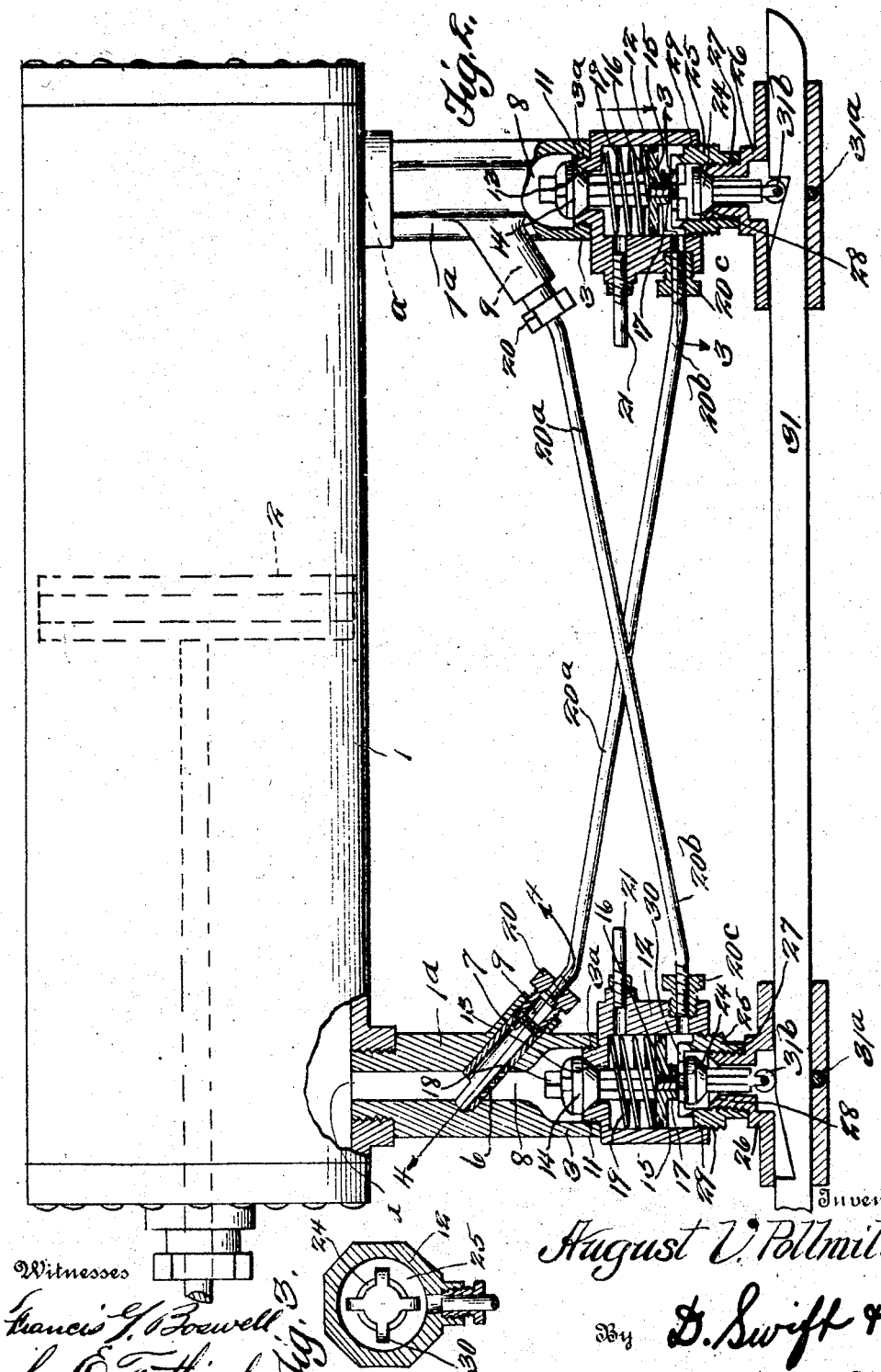

AUGUST V. POLLMILLER, OF FORT MADISON, IOWA.

AUTOMATIC SLIDE-LEVER CYLINDER-COCK.

1,021,887. Specification of Letters Patent. Patented Apr. 2, 1912.

Application filed September 30, 1911. Serial No. 652,036.

*To all whom it may concern:*

Be it known that I, AUGUST V. POLLMILLER, a citizen of the United States, residing at Fort Madison, in the county of Lee and State of Iowa, have invented a new and useful Automatic Slide-Lever Cylinder-Cock; and I do hereby declare the following to be a full, clear, and exact description of the invention, such as will enable others skilled in the art to which it appertains to make and use the same.

This invention relates to a new and useful automatic slide lever cylinder cock.

The main object of the invention is to provide novel means for taking care of the exhaust steam from the cylinder.

A further object of the invention is the provision of a slide lever operated by a valve motion gearing (not shown) for operating the valve cocks, to permit the exhaust of the steam, on one side and then the other of the piston shown in dotted lines in the cylinder.

A feature of the invention is the provision of means arranged in the cylinder cocks for catching foreign matter or objects, as the steam exhausts.

The drawings disclose only one form of the invention, but in practical fields this form may require alterations, to which the applicant is entitled, provided the alterations are comprehended within the scope of what is claimed.

The invention comprises further features and combinations of parts, as hereinafter set forth, shown in the drawings and claimed.

In the drawings:—Figure 1 is a view in elevation, showing the application of the cylinder cocks, as applied to a cylinder. Fig. 2 is a similar view partly in section, showing the interior structure of the valve cocks. Fig. 3 is a sectional view on line 3—3 of Fig. 2. Fig. 4 is a sectional view on line 4—4 of Fig. 2.

Referring more especially to the drawings, 1 designates the cylinder having the usual piston (shown in dotted lines), which is designated by the character 2. Threaded into the cylinder 1 are two casings $1^a$. The ends 3 of the casings are interiorly threaded, as shown at $3^a$. The steam is adapted to exhaust, first through one casing and then the other at the points $a$. As the exhaust steam and water exhaust, the foreign matter is strained by the screen members 6 and 7. The water is strained by the screen 6, and passes through the duct 8 of the casings, while the steam passes through the duct 9, so as to be strained by the screen 7. The screen member 6 is in the form of a cylindrical shell, while the screen 7 is in the form of a meshwork plate. The cylindrical shells are perforated, as shown.

Engaging the threads $3^a$ of the casings $1^a$ are exteriorly threaded restricted portions 11 of the casings 12. The restricted portions 11 are provided with valve seats 13, with which the winged valves 14 coöperate. One end of each of the valve members 14 is provided with a reduced threaded end, which is threaded into the disk member 15, as shown at 16. The disk members 15 are provided with hexagonal shaped heads 17, while the ends of the valve members 14 are formed with rectangular heads 18. By these heads, the disk members 15 and the valve members 14 may be connected together, as at 16, by the threads. Interposed between the disk members and interior annular shoulders of the casings 12 are coil springs 19, which serve to hold the valve members 14 in contact with their seats 13.

Threaded into the ducts 9 are plugs 20, in which the pipes $20^a$ are threaded. The ends $20^b$ of the pipes $20^a$ are threaded into the plugs $20^c$, which are threaded into the casings 12. In this manner, the exhaust steam passes from first one and then the other of the ducts 9, through first one and then the other of the pipes $20^a$, into first one and then the other of the casings 12, so as to raise the respective valve member 15. When the valve members 15 are raised, the valve members 14 are unseated, against the action of the springs 19, so as to permit the water which is strained by the screens 6 to pass into the casings 12, between the valve members 14 and the valve members 15. This water between the valve members 14 and the valve members 15 is carried off by way of the pipes 21, into any suitable drip pan, not shown. The steam which passes through the pipes $20^c$ into the casings 12 in the rear or behind the valve members 15 condenses finally, between the valve members 15 and the valves 24. The valve members 24 are mounted in the casings 25 and 26. Each casing 25 is threaded into its respective casing 26, as shown at 27, at one end. The casings 26 are formed with valve seats 28, with which the valves 24 coact.

The other ends of the casings 25 are threaded into the casings 12, as shown at 29. The casings 25 are provided with spider members 30, which limit the valves 24 in their movements. After the steam between the valve members 15 and the valve members 24 condenses, the same may be drawn off by unseating the valves 24. The valves 24 are unseated alternately by means of the slide lever 31, which is adapted to be operated by the valve motion gearing (not shown). The slide lever passes through the casings 26 and operates upon the pins 31$^a$. This slide lever is provided at each end with cam portions which engage the frictional members 31$^b$, which are carried by the valve members 24. These cam portions are reversed in position, so as to alternately raise the valves 24 as the slide lever moves.

The invention having been set forth, what is claimed as new and useful is:—

1. In combination, a main cylinder, a pair of cylinder cocks connected to the exhaust ports of the main cylinder, the cylinder cocks comprising casings, normally seated valve operated disks arranged in the casings, a water chamber between the valve and the disk crossing pipes connecting the casings below the disks, the casings having main passage ways and provided with branch passage ways, tubular members having a perforated portion extending on an inclination through the branch passage ways with the perforated portions arranged in the main passage ways, screw nuts, one threaded to one end of each of the pipes, and threaded into each of the branch passage ways, thus connecting the pipes to the branch passage ways, and screen members arranged between the tubular members and the screw nuts.

2. In combination, a main cylinder, a pair of cylinder cocks connected to the exhaust ports of the main cylinder, the cylinder cocks comprising casings, normally seated valve operated disks arranged in the casings, a water chamber between the valve and the disk crossing pipes connecting the casings below the disks, the casings having main passage ways and provided with branch passage ways, tubular members having a perforated portion extending on an inclination through the branch passage ways with the perforated portions arranged in the main passage ways, screw nuts, one threaded to one end of each of the pipes, and threaded into each of the branch passage ways, thus connecting the pipes to the branch passage ways, and screen members arranged between the tubular members and the screw nuts, the casings terminating in extension casings beyond the disks, valves arranged in the extension casings, the last named valves having stems provided with anti-frictional means, the extension casings having guides, and a slide lever operable through the guides having inclined cammed portions to coöperate with the anti-frictional means for raising the last named valve.

In testimony whereof I have signed my name to this specification in the presence of two subscribing witnesses.

AUGUST V. POLLMILLER.

Witnesses:
OMAR E. HERMINGHAUSEN,
ALICE HYDE.

Copies of this patent may be obtained for five cents each, by addressing the "Commissioner of Patents, Washington, D. C."